June 27, 1967  S. DORRIS  3,328,684
TRANSISTORIZED CIRCUIT CONTINUITY TESTER WITH LAMP INDICATOR
AND SWITCH MEANS IN THE COLLECTOR CIRCUIT
Filed Sept. 10, 1964  2 Sheets-Sheet 1
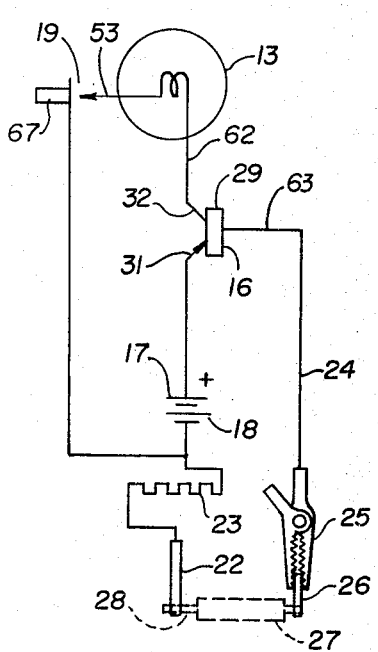
Fig. 1
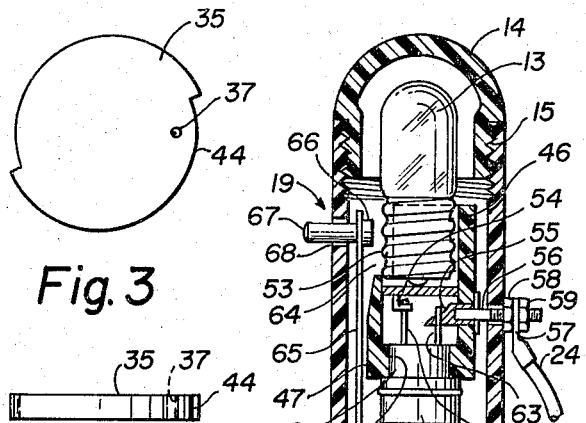
Fig. 3
Fig. 4
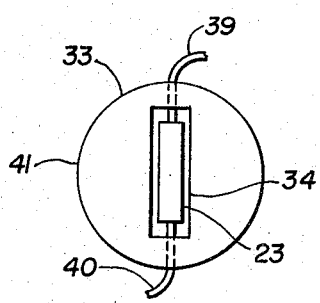
Fig. 6
Fig. 5
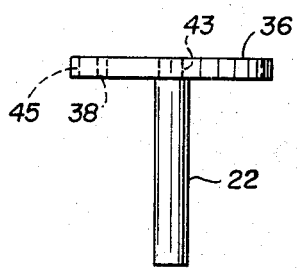
Fig. 7
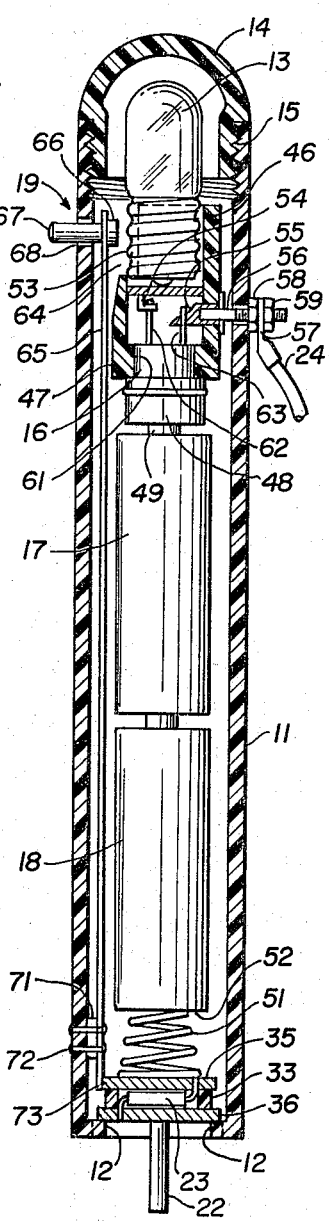
Fig. 2
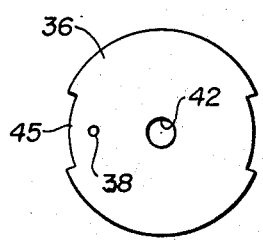
Fig. 8
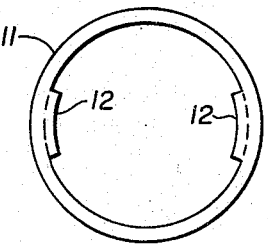
Fig. 9
INVENTOR.
SAM DORRIS
BY
Schramm, Kramer & Sturges
ATTORNEYS June 27, 1967  S. DORRIS  3,328,684
TRANSISTORIZED CIRCUIT CONTINUITY TESTER WITH LAMP INDICATOR
AND SWITCH MEANS IN THE COLLECTOR CIRCUIT
Filed Sept. 10, 1964  2 Sheets-Sheet 2

INVENTOR.
SAM DORRIS
BY Schramm, Kramer & Sturges

ATTORNEYS

United States Patent Office 3,328,684
Patented June 27, 1967

3,328,684
TRANSISTORIZED CIRCUIT CONTINUITY TESTER WITH LAMP INDICATOR AND SWITCH MEANS IN THE COLLECTOR CIRCUIT
Sam Dorris, 3571 Bainbridge Road,
Cleveland, Ohio 44118
Filed Sept. 10, 1964, Ser. No. 395,485
3 Claims. (Cl. 324—51)

This invention relates to continuity testers and particularly to testers for the continuity of circuits and circuit elements of relatively high resistance or circuit elements such as condensers which normally do not complete a direct-current circuit.

Simple, lightweight continuity testers employing a flashlight type light bulb as a current indicator and flashlight or penlight type batteries as a current source are not normally suitable for measuring continuity of circuits where the resistances in question exceed certain value of the order of approximately twelve ohms since such a resistance would prevent the bulb from lighting and would give the same indication as an open circuit. This limits the tester to use on circuits of low resistance and prevents its use in the measurement of the continuity of many resistors and such elements as solenoids and windings which consist of many turns and therefore have a relatively high resistance.

It is accordingly an object of the invention to provide a simple, inexpensive, lightweight portable circuit continuity tester for use on high resistance circuits of the order of as much as 40,000 ohms. A further object of the invention is to provide a circuit continuity tester for relatively delicate windings and transistors to which high current values may not be applied.

A still further object of the invention is to provide a continuity tester for indicating both open circuits and short circuits as well as capacitances in condensers of one microfarad or more.

Other and further objects, features and advantages of the invention will become apparent as the description proceeds.

In carrying out the invention in accordance with a preferred form thereof, a tubular insulating casing composed of a suitable insulating material is provided and the elements are mounted therein. These include a bias resistor, dry cells, a transistor and a flashlight type lamp bulb. The lamp bulb is mounted in one end of the tubular casing and a test prod is mounted at the other end with a flexible test lead being secured to the side of the casing so that continuity of an element to be tested may be determined by pressing the prod against one portion of the circuit to be tested and bringing the test lead into contact with another portion thereof.

Electrical connections are so made that the dry cells are connected in series with the test lamp in the collector-emitter circuit of the transistor, the test lead is connected to the transistor base and the test prod is connected in series with a bias resistor to one of the terminals of the dry cells.

A better understanding of the invention will be provided by the following detailed description considered in conjunction with the accompanying drawings, in which:

FIG. 1 is a schematic circuit diagram of a continuity tester in accordance with the invention;

FIG. 2 is a view of a longitudinal section of an embodiment of the invention;

FIG. 3 is a plan view of a metallic disc serving as one terminal of a bias resistor;

FIG. 4 is an elevation of the disc of FIG. 3;

FIG. 5 is an elevation of an insulating fiber sandwich insert for supporting the bias resistor;

FIG. 6 is a plan view of the resistor and fiber sandwich insert as assembled;

FIG. 7 is an elevation of a test prod-supporting disc assembled with the test prod;

FIG. 8 is a plan view of the parts shown in FIG. 7;

FIG. 9 is an end view as seen from the test prod end of the supporting casing for the apparatus;

Like reference characters are utilized throughout the drawing to designate like parts.

Figure 10:
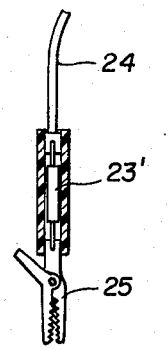
FIG. 10 is a fragmentary view partially in section of a modified test lead incorporating a bias resistor.

The compact, self-contained structure of the apparatus is illustrated in FIG. 2. It comprises a supporting casing in the form of a tube 11 preferably composed of insulating material and open at both ends. At the lower end, as shown also in FIG. 9, ledges 12 of arcuate shape and extending for only a portion of the periphery of the tube 11 are provided for enabling a prod support to be removably secured in the tube 11. The upper end of the tube 11 is left open to receive a lamp bulb 13 and permit it to be visible in order that illumination thereof may be observed. Preferably for protection of the lamp bulb 13 and other elements mounted within the tube 11, a transparent cap 14 is provided, the parts 11 and 14 preferably being formed with suitable screw threads to form a threaded connection 15. The cap 14 may be composed of any suitable sturdy material such as a polymerized methyl methacrylate.

The circuit elements mounted within the tube 11 are represented schematically in FIG. 1. These comprise a transistor 16, a pair of dry cells such as penlight cells 17 and 18, a switch 19, a current-indicator, lamp bulb 13, a test prod 22, a bias resistor 23, a test flexible lead 24 and an alligator type test clip 25. The arrangement is such that the test clip is adapted to grasp one terminal 26 of a circuit element 27, shown in dotted lines, which is to be tested and has a second terminal 28 against which the test prod 22 may be brought when it is desired to test circuit continuity of the device 27.

The transistor 16 is preferably an audio type, solid-state amplifier such as that sold under the designation 2N107. As shown, it has a base 29, an emitter 31 and a collector 32. The lamp bulb 13 may be any suitable low current drain type of incandescent lamp bulb such as that sold under the designation GE No. 48.

As shown in FIG. 2, there is a subassembly for supporting the test prod 22 and protecting and mounting the bias resistor 23. This subassembly comprises a fiber sandwich insert 33 composed of insulating material of a thickness somewhat exceeding the diameter of the resistor 23 and having a transverse cavity 34 for receiving the resistor 23. As shown, the resistor 23 is a conventional tubular type carbon resistor which may be of half-watt capacity and of suitable resistance value for biasing the transistor 16. For example, in the case of a PNP transistor of type 2N218, the resistor 23 may be a 1,500-ohm resistor. On either side of the fiber sandwich insert 33 and lying against it, are metal discs 35 and 36, shown as above and below, respectively. Two openings 37 and 38 are provided in the discs 35 and 36, respectively, for receiving leads 39 and 40 of the resistor 23 and these leads are soldered to the discs or plates 35 and 36, respectively, in the conventonal manner.

An opening 42 is provided in the disc 36 to receive a slightly reduced diameter portion 43 of the test prod 22.

The dimensions are so chosen as to form a press or drive fit and cause the prod 22 to be supported by the disc 36.

The metal discs 35 and 36 are secured to the fiber sandwich insert 33 in any suitable manner as by means of cementing in order to form a separate unit containing the bias resistor 23 and supporting the test prod 22. In order that this unit may be removably supported in the lower end of the supporting tube or casing 11, the disc-shaped elements 33, 35 and 36 are suitably formed. Portions 44 of the periphery of disc 35 are cut away spirally in the shape of cams. The disc 36 may either have that same shape or be notched to form arcuate notches or insets 45. The insert 33 preferably has a small enough diameter periphery 41 to clear the arcuate ledges 12 at the lower end of the tube 11 to provide clearance when the unit including the insert 33 and the discs 35 and 36 is inserted in the lower end of the tube 11. It will be understood, of course, that after the insertion has been made the unit is turned sufficiently so that the lower disc 36 will be supported upon the ledges 12. The support results from the fact that the unit is spring biased downwardly as will be explained presently.

The arrangement is such that the dry cells 17 and 18 are supported in the tube 11 between a lamp base support 46 and the resistor protecting disc 35. The lamp base support 46 in turn is formed to receive a transistor mount 47, and a conductive cap 48 is provided to fit on the body of the transistor 16. The dry cells 17 and 18 are supported in a manner similar to the arrangement employed in flashlights with a projecting terminal 49 adapted to make contact with the transistor cap 48 when the dry cells are resiliently pressed upward and with a resilient supporting spring 51 mounted between the disc 35 and the lower surface or contact terminal 52 of the lower dry cell 18. The spring 51 is secured in any suitable manner as by soldering to the disc 35 so that it completes an electrical connection from the top lead 39 of the resistor 23 to the dry cells 17 and 18.

The lamp support 46 comprises a cup-shaped member composed of a suitable insulating material such as a molded condensation product of phenol and formaldehyde, for example, or polystyrene or other suitable substance. The dimensions are such as to receive, with a drive fit, the threaded brass socket 53 of a conventional miniature lamp socket having an insulated center terminal to which a connection lug 54 is mechanically and electrically connected. For mounting the lamp base support 46, a conductor stud 55 is molded therein having a threaded shank 56 threaded into the stud 55 and adapted to be secured in a threaded opening in the side of the tube or casing 11 and to make electrical connection with a spade lug 57 at the end of the test lead 24, which is preferably insulated. Nuts 58 and 59 are provided for securing the threaded shank 56 and the spade lug 57.

A bore 61 is formed in the base of the cup member 46 of such diameter as to receive the transistor 16 with a press fit.

The transistor 16 is provided with a lead 62 electrically connected to the collector 32, and a second lead 63 electrically connected to the base 29. The emitter lead, not visible, makes electrical contact with the cap 48. The leads 62 and 63 are electrically connected in a suitable manner as by soldering or the like to the terminal lugs 54 and 55, respectively.

As shown in FIG. 2, an axially extending slot 64 is left in the lamp mounting member 46 in order that the external surface of the metallic screw socket 53 may serve as the stationary contact of the normally open switch 19. The movable contact of the switch 19 comprises a spring strip 65 composed of a suitable conductive material such as brass or copper, for example, and preferably has a contact button 66 electrically and mechanically connected to the inner surface at the end thereof with an outwardly projecting shank or pin 67 projecting through an opening 68 in the tube 11 to serve as a thumb button for the switch 19. Preferably the shank or pin 67 is composed of an insulating material or if it constitutes the shank of a screw head forming the button 66 it is coated with a suitable insulating material such as a plastic.

The lower end of the spring strip 65 is connected to the tube 11 near its lower end in any suitable manner, for example, by means of a spacing block 71 and rivets 72. The strip 65 has a lower tip end 73 extending beyond the upper surface of the resistor terminal disc 35 so that when the assembly including the disc 35 is inserted electrical contact is made between the tip end 73 of the strip 65 and the disc 35.

Since the disc 35 has cammed edges as shown in FIG. 3, the edge of the disc 35 makes contact with the tip end 73 as soon as the disc 35 has been turned sufficiently. However, the edges of the disc 35 will not catch on the spring strip 65 to interfere with turning in the same direction after insertion when it is desired to remove the resistor disc and test prod assembly from the unit for replacement of dry cells.

It will be understood that when it is desired to replace the dry cells 17 and 18 with others, the assembly including the discs 35 and 36 and the fiber sandwich insert 33 are removed by rotating this unit until the notches 41, 44 and 45 clear the ledges 12. After the replacement dry cells have been inserted the unit including the discs 35 and 36 is reinserted and rotated until the ledges 12 support the assembly. The spring 51 pressing upward against the dry cells 17 and 18 and downward against the disc 35 secures the assembly.

When it is desired to test a circuit element such as the element 27 shown in FIG. 1 for circuit continuity, the test prod 22 is brought into contact with one portion of the element 27 with the alligator test clip 25 grasping another portion of the element and thereupon the thumb button or pin 67 is depressed to close the switch 19. This completes the emitter-collector circuit of the transistor 16 through the current supply comprising the dry cells 17 and 18. If the element 27 provides a completed circuit between the contact elements 22 and 25, an emitter-base circuit is formed. Thereupon the current flowing through the bias resistor 23 provides a forward bias to the base 29 causing the transistor 16 to carry an amplified current and light the bulb 13. This is true even though the resistance of the unit 27 is relatively high, of the order of 30,000 or 40,000 ohms, for example. If the element 27 provides an open circuit, the transistor 16 remains biased off and no current flows through the lamp 13 indicating that there is an open circuit.

As shown, the transistor circuit employed is the common emitter circuit with fixed bias.

The switch 19 assures that not even a negligible current will flow through the transistor 16 to drain the battery 17 and 18. This would otherwise happen eventually even without forward bias. Resistance in the 30,000 to 40,000 ohm range will dim the bulb to a degree depending upon the resistance.

In testing electrolytic capacitors, they are first discharged completely and the test lead is connected to the positive lead on the capacitor with the test prod 22 applied to the negative terminal. If the capacitor unit is good, the lamp 13 will flash and the duration of the flash will depend upon the capacity of the electrolytic capacitor in microfarads. If there is no light, the unit is either charged or open. If the light stays on, the unit is shorted. The tester is not designed for use on capacitors of less than about one microfarad capacity. The invention has been described as used when the transistor 16 constitutes a PNP type transistor. It will be understood, however, that the invention is not limited thereto and does not exclude the use of an NPN type transistor. In this case the polarity of the current source 17–18 will, of course, be reversed and likewise the procedure in testing an electrolytic capacitor will be changed with the test prod 22 applied to the positive terminal instead of the negative terminal of the electrolytic capacitor.

In the modified arrangement of FIGS. 10 to 13 there is a bias resistor 23′ mounted within a plastic tube 74 and soldered directly at one end to the test clip 25 and at the other end to the lead 24. With this arrangement no bias resistor 23 is required to be mounted within the tube 11. Instead the test prod 22 is secured to a disc 75 and mounted inside a cap 76 adapted to be threaded to the lower end of a tube 11′ modified to provide mating threads 77 at the lower end. A center hole 78 is provided in the cap 76 through which the test prod 22 protrudes and a spiral spring 51 serves as in the case of the embodiment of FIG. 2 to keep the test cells and the dry cell in place resiliently.

Figure 11:
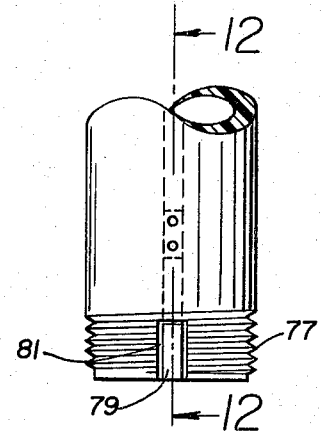
FIG. 11 is a fragmentary view of an alternative form of the lower end of the insulating tube or casing 11.
Figure 12:
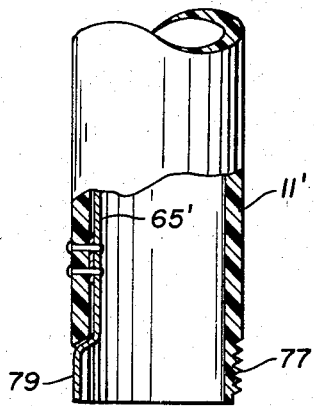
FIG. 12 is a longitudinal sectional view of the modification of FIG. 11 represented as cut by a plane 12—12.
Figure 13:
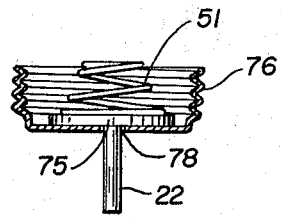
FIG. 13 is a view partially in section of a metal cap for holding the test prod.

In the arrangement of FIGS. 11, 12 and 13 a modified switch strip or spring strip 65′ is utilized which is made slightly longer and bent as shown at the lower end 79 to protrude through a slot 81 cut in the tube 11′ so as to make contact with the metal cap 76.

While the invention has been described as embodied in concrete form and as operating in a specific manner in accordance with the provisions of the patent statutes, it should be understood that the invention is not limited thereto, since various modifications thereof will suggest themselves to those skilled in the art without departing from the spirit of the invention, the scope of which is set forth in the annexed claims.

What is claimed is:

1. A continuity and capacitor tester comprising in combination a supporting shell including an insulating tube and having an interior cavity; a transistor support mounted within said cavity; a test prod supported at one end of the cavity to protrude from the supporting shell; a biasing circuit including a bias resistor supported in one end of the cavity adjacent the test prod on a bias resistor mounting; said bias resistor mounting including a fiber sandwich insert having a cavity therein adapted to receive the resistor; dry cell means mounted in the cavity between the bias resistor and the transistor support, the dry cell means having first and second terminals of opposite polarity; a pair of metal plates on either side of said fiber sandwich insert, one of which is secured to the test prod end of the supporting casing, the other of which is secured in the casing inwardly, the bias resistor being connected electrically between the two plates, the outer plate being electrically connected to and supporting the test prod, the inner plate being adapted to be electrically contacted by the first terminal of the dry cell means; a transistor in the transistor support having a collector, a base and an emitter; the emitter being connected to the second terminal of the dry cell means; a current indicator mounted in the supporting shell, comprising an incadescent lamp and a lamp socket mounted in the casing at the end thereof away from the test prod, with a center terminal connected to the collector of the transistor and a screw shell with a portion of the periphery thereof exposed; a flexible test lead having an end secured to the supporting shell and electrically connected to the base of the transistor, and having a second end adapted to be connected to a circuit to be tested; and a conductor spring having a tip adapted to contact the exposed portion of the screw shell, said conductor spring being supported at one end and electrically connected to the first dry cell means terminal and adapted to be pressed against the second terminal of the current indicator for completing a collector-emitter circuit when a test is to be made, said insulating tube being provided with an opening with a pin extending therethrough secured to the end of the conductor spring for enabling the spring to be brought into contact with the screw shell of the lamp base by pressing upon the spring from the exterior of the supporting shell; the dry cell means being connected with such polarity as to provide a forward bias; said test prod and said test lead defining a deliberately placed discontinuity in the biasing circuit, whereby the connection of the test prod and the test lead to a circuit element to be tested indicates continuity in the circuit element to be tested, even though it may be of high resistance, by flow of amplified current through the current indicator and the production of an indication of current continuity.

2. A continuity and capaictor tester as in claim 1, wherein the transistor support comprises a cap having an exterior surface composed of electrically conducting material adapted to be contacted by the second terminal of the dry cell means when mounted in place and said cap is electrically connected to the emitter of the transistor.

3. An apparatus as in claim 1, wherein a dry cell spacing spring is secured to the inward plate and has one end electrically connected thereto and the other end adapted to press against and make electrical connection with the first terminal of the dry cell means and thereby to press the other terminal of the dry cell means into contact with the transistor conductor cap.

References Cited

UNITED STATES PATENTS

| | | | |
|---|---|---|---|
| 1,937,651 | 12/1933 | Graubner | 200—60 |
| 2,413,484 | 12/1946 | Berger | 324—53 |
| 2,581,116 | 1/1952 | Lewis | 324—51 |
| 2,763,834 | 9/1956 | MacDonald et al. | 324—53 |
| 2,839,724 | 6/1958 | Chandler et al. | 324—53 |
| 2,942,189 | 6/1960 | Shea et al. | 324—133 |
| 2,956,229 | 10/1960 | Henel | 324—133 |
| 3,040,249 | 6/1962 | Schwarckopf et al. | 324—62 X |
| 3,157,870 | 11/1964 | Marino et al. | 324—133 X |
| 3,210,751 | 10/1965 | Shiraishi | 340—256 |

FOREIGN PATENTS

| | | |
|---|---|---|
| 1,236,403 | 6/1960 | France. |
| 910,045 | 11/1962 | Great Britain. |

OTHER REFERENCES

Patrick, M. H.: "Continuity Checker," Radio Electronics XXXIV, No. 9, September 1963, p. 47.

RUDOLPH V. ROLINEC, *Primary Examiner.*

WALTER L. CARLSON, *Examiner.*

G. R. STRECKER, *Assistant Examiner.*